(12) United States Patent
Shi et al.

(10) Patent No.: US 7,474,813 B2
(45) Date of Patent: Jan. 6, 2009

(54) CONNECTOR MOUNTABLE ASYMMETRIC FREE SPACE OPTICAL ISOLATORS

(75) Inventors: Ming Shi, Pleasanton, CA (US); Steve Wang, San Jose, CA (US); William R. Freeman, Castro Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/836,711

(22) Filed: Apr. 30, 2004

(65) Prior Publication Data

US 2005/0100263 A1    May 12, 2005

Related U.S. Application Data

(60) Provisional application No. 60/518,778, filed on Nov. 10, 2003.

(51) Int. Cl.
*G02B 6/00* (2006.01)
(52) U.S. Cl. ...................................................... 385/11
(58) Field of Classification Search ................ None
See application file for complete search history.

(56) References Cited

U.S. PATENT DOCUMENTS

| | | | |
|---|---|---|---|
| 4,756,607 A | 7/1988 | Watanabe et al. | |
| 4,770,505 A | 9/1988 | Okazaki | |
| 5,087,984 A | 2/1992 | Heiney et al. | |
| 5,105,307 A | * | 4/1992 | Nishiyama et al. ........ 359/484 |
| 5,278,853 A | 1/1994 | Shirai et al. | |
| 5,359,689 A | 10/1994 | Iwatsuka et al. | |
| 5,375,009 A | 12/1994 | Otani et al. | |
| 5,381,261 A | 1/1995 | Hirai et al. | |
| 5,452,122 A | * | 9/1995 | Tsuneda et al. ............ 359/281 |
| 5,581,640 A | 12/1996 | Pan et al. | |
| 5,612,813 A | 3/1997 | Damman et al. | |
| 5,715,080 A | 2/1998 | Scerbak | |
| 5,757,538 A | 5/1998 | Siroki | |
| 5,841,922 A | 11/1998 | Iwatsuka et al. | |
| 5,912,766 A | 6/1999 | Pattie | |
| 5,917,643 A | 6/1999 | Watanabe et al. | |
| 5,930,038 A | 7/1999 | Swan | |
| 6,049,425 A | 4/2000 | Watanabe et al. | |
| 6,421,176 B1 | 7/2002 | Takahashi et al. | |
| 6,430,323 B1 | 8/2002 | Kokkelink et al. | |
| 6,449,091 B1 | 9/2002 | Cheng et al. | |
| 6,480,636 B1 | 11/2002 | Satoh et al. | |
| 6,545,795 B2 | 4/2003 | Matsushita et al. | |

(Continued)

*Primary Examiner*—Sung H Pak
*Assistant Examiner*—Hoang Tran
(74) *Attorney, Agent, or Firm*—Workman Nydegger

(57) ABSTRACT

A compact optical isolator includes a polarizer, a Faraday rotator, and an analyzer that are arranged in series. A magnet is also included to provide a magnetic field to the Faraday rotator. The outer edges of the polarizer, Faraday rotator, and analyzer are preferably parallel to each other and to the optical path of the incoming light beam so that the optical aperture through the optical isolator is maximized. In addition, each of the polarizer, the Faraday rotator, and the analyzer have at least one facet in the optical path of the light beam that is tilted from perpendicular with respect to the light beam such that reflections are avoided. The analyzer may have a wedge shape such that one surface mates level with an optical fiber and the opposing surface is tilted to prevent reflections. Alternatively, a wedge-shaped block may be located between the analyzer and the optical fiber.

15 Claims, 3 Drawing Sheets

U.S. PATENT DOCUMENTS

| | | |
|---|---|---|
| 6,556,733 B2 | 4/2003 | Dy et al. |
| 6,580,558 B2 | 6/2003 | Zhu et al. |
| 6,619,856 B1 * | 9/2003 | Lampert et al. ............... 385/78 |
| 2001/0012422 A1 | 8/2001 | Watanabe |
| 2002/0060843 A1 | 5/2002 | Huang et al. |
| 2003/0030888 A1 * | 2/2003 | Sakai et al. .................. 359/333 |
| 2004/0234227 A1 * | 11/2004 | Sahashi et al. .............. 385/140 |

* cited by examiner

CONNECTOR MOUNTABLE ASYMMETRIC FREE SPACE OPTICAL ISOLATORS

CROSS-REFERENCE TO RELATED APPLICATIONS

This application claims the benefit of U.S. Provisional Application No. 60/518,778, filed Nov. 10, 2003, which is herein incorporate by reference in its entirety.

BACKGROUND OF THE INVENTION

1. The Field of the Invention

The invention relates to the field of optical devices. More particularly, this invention relates to the field of optical isolators for use in high speed optical networks.

2. The Relevant Technology

Computer and data communications networks continue to develop and expand due to declining costs, improved performance of computer and networking equipment, the remarkable growth of the internet, and the resulting increased demand for communication bandwidth. This demand will continue to be fueled by high, bandwidth applications such as internet gaming and movie or music rentals and sales. This increased demand is occurring within and between metropolitan areas as well as within communications networks. These networks allow increased productivity and utilization of distributed computers or stations through the sharing of resources, the transfer of voice and data, and the processing of voice, data, and related information at the most efficient locations.

Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of fiber optic systems required.

Through fiber optics, digital data in the form of light signals is formed by light emitting diodes or lasers and then propagated through a fiber optic cable. Such light signals allow for high data transmission rates and high bandwidth capabilities. Other advantages of using light signals for data transmission include their resistance to electromagnetic radiation that interferes with electrical signals; fiber optic cables' ability to prevent light signals from escaping, as can occur with electrical signals in wire-based systems; and the ability of light signals to be transmitted over great distances without the signal loss typically associated with electrical signals on copper wire.

One optical device that allows for the effective communication of optical signals from a light emitting source, such as a laser, to an optical fiber is an optical isolator. Generally, an optical isolator is a component of an optical system that is used to block out reflected and unwanted light. One schematic configuration of an optical isolator is presented in FIG. 1, including a polarizer 102, a Faraday rotator 104 (formed of a magneto-optic (MO) crystal), a polarization analyzer 106 ("analyzer"), and a magnet 107. The components are depicted in duplicate in order to show the state of polarization of light in each of the forward and backward directions. Accordingly, each arrow in FIG. 1 indicates the state of polarization of the light passing through each of the polarizer 102, the Faraday rotator 104, and the analyzer 106.

The key to the function of an isolator is that the direction of rotation of the polarized light depends upon the direction of the magnetic field from magnet 107 and not on the direction of the light passing through the crystal. Thus, the MO crystal is not a reciprocal device, which makes almost unique among optical devices. Conceptually, the magnetic field tries to align the atoms of the MO crystal and, like pushing on a spinning top, causes them to precess. It is this precessional motion that causes the polarized light to rotate as it passes through the crystal. Since the precession direction only depends upon the direction of the magnetic field, the MO crystal is nonreciprocal from the point of view of the light. It is the thickness of the MO crystal that determines the degree of rotation of the light passing through.

Generally, a polarizer is an optical component that only passes light in a particular state of polarization, for example a vertical state of polarization. By arrow 108, it is indicated that light in a vertical state of polarization is passed through polarizer 102. In contrast, light in other states of polarization, such as horizontal, is not passed through the polarizer 102.

The Faraday rotator 104 receives light in the vertical state of polarization from polarizer 102. Generally, a Faraday rotator is an asymmetric device, which is usually an yttrium-iron-garnet (YIG) material, which rotates the state of polarization by a selected amount in one direction, for example clockwise, regardless of the direction of light propagation. The composition and crystal structure of an yttrium-iron-garnet (YIG) polarizer are well known in the art. The amount of rotation is determined by the thickness of the material. Thus, as indicated by arrow 110, light passing through Faraday rotator 104 is rotated 45° from vertical.

The light, now at a 45° angle from vertical, as indicated by arrow 112, then passes through analyzer 106. Generally, an analyzer is somewhat broader in function than a polarizer in that while a polarizer passes light in one state of polarization while absorbing other light, an analyzer separates light based on its state of polarization. However, in free-space isolators the analyzer and polarizer may be identical.

After light passes through the analyzer, some of the light is reflected back to the analyzer by other downstream optical devices. Of all the light reflected back to the analyzer, only the light with a 45° orientation of polarization is allowed to pass through the analyzer, as indicated by arrow 112. Thus, if the reflected light has a random polarization then the analyzer 106 attenuates the incoming reflection by 50% or 3 dB.

After passing through the analyzer, the reflected light is then rotated once more by Faraday rotator 104 in the clockwise direction, as indicated by arrow 114, to have a total rotation of 90°. However, light in this horizontal state of polarization cannot pass through polarizer 102 because it is rotated 90°, as indicated by short arrow 116. Thus, light can pass through optical isolator in a first direction through polarizer 102, Faraday rotator 104, and analyzer 106; but cannot pass in the opposite direction back through. More particularly, light that is polarized perpendicular to the polarizer is severely attenuated according to the extinction ratio of the polarizer, which is usually greater than 30dB. Hence, it is not that light cannot pass through the polarizer; it is that the light is attenuated by more than a factor of 1000. The effective result is that no light passes through the polarizer.

In addition, in order to minimize reflections of the light emitted from a laser from the polarizer surface back to the emitting laser, the polarizer surface must be tilted with respect to the laser propagation direction. Referring now to FIG. 2, in the conventional design the whole isolator chip assembly 200 and the magnet ring 202 are tilted by a few degrees (0-8 degrees), as shown in FIG. 2. Since the whole assembly 200 is tilted, the edge areas forming the tilt angles may block the transmission of the light and effectively reduce the aperture through which light can pass through the isolator, as indicated by dotted lines 204. Therefore, areas outside the aperture (above and below dotted lines 204) are not useful and they must be taken into account in the determination of the optical clear aperture requirements. Because of this, the isolator chip material is not as effectively used and a proportionally larger device must be designed.

In all cases, the material is by far the major factor of the isolator cost. One way to reduce the materials usage is to place isolators closer to the fiber connector. This has led to the design of ferrule mountable isolators that can be attached directly to the end surface of an APC connector with 8 degree tilt angle. In this case, the tilting of the polarizer surface is realized upon mounting to the APC fiber connector. This design has drastically reduced the requirement of clear aperture for the isolator chips and consequently, the overall cost of isolators.

While these tiny isolators are very useful for transmitter optical subassemblies ("TOSAs") with angled APC connectors, they are not suitable for TOSAs with flat, LC Connectors because of the absence of tilt angle from the connector. This is a big disadvantage when the use of LC connectors is desired or required, as is the case with the Small Form-Factor Pluggable Transceiver MultiSource Agreement ("MSA"). Another drawback is that the standard APC connector has an 80 tilt angle, which is much bigger than necessary for minimizing polarizer surface reflection (typically 2-6 degrees). The bigger the tilt angle, the bigger the optical coupling loss. Therefore, these ferrule mountable isolators are not optimized for optical coupling purposes.

BRIEF SUMMARY OF THE INVENTION

The present invention relates to an ultra compact optical isolator. The optical isolator generally includes a polarizer, a Faraday rotator, and an analyzer that are each arranged in series such that a beam of light passing through the optical isolator passes first through the polarizer, then through the Faraday rotator and, finally, through the analyzer. The outer edges of the polarizer, Faraday rotator, and analyzer, are preferably parallel to each other and to the travel path of the incoming laser beam (or other light source known in the art) so that the optical aperture through the optical isolator is maximized. A magnet is also included in the optical analyzer to provide a magnetic field to the Faraday rotator. The magnet is preferably configured as the isolator housing.

In addition, each of the polarizer, the Faraday rotator, and the analyzer have at least one facet in the optical path of the light beam that is tilted from perpendicular with respect to the light beam such that reflections are avoided. More particularly, the analyzer preferably has a wedge shape such that one facet thereof is tilted to avoid reflections whereas the opposing facet has a surface perpendicular to the beam of light such that it can easily be attached to an LC connector, or other connector, via an optical epoxy.

Accordingly, a first example embodiment of the invention is a compact optical isolator. The isolator includes: a polarizer having front and rear facets that are tilted from perpendicular with respect to the optical path of a beam of light; a Faraday rotator that receives the beam of light from the polarizer, wherein the Faraday rotator has front and rear facets that are tilted from perpendicular with respect to the optical path of the beam of light; and an analyzer that receives the beam of light from the Faraday rotator, wherein the analyzer has a front facet that is tilted from perpendicular with respect to the optical path of the beam of light and a back facet that is perpendicular to the optical path of the beam of light. Each of the polarizer, the Faraday rotator, and the analyzer are configured substantially parallel with respect to the optical path of a beam of light such that the effective aperture of the optical isolator is maximized.

Another example embodiment of the invention is a compact optical isolator that has a glass wedge adjacent to an optical analyzer that has parallel surfaces in the optical path. This optical isolator includes generally: a polarizer having front and rear facets that are tilted from perpendicular with respect to the optical path of a beam of light; a Faraday rotator that receives the beam of light from the polarizer, wherein the Faraday rotator has front and rear facets that are tilted from perpendicular with respect to the optical path of the beam of light; an analyzer that receives the beam of light from the Faraday rotator, wherein the analyzer has front and rear facets that are tilted from perpendicular with respect to the optical path of the beam of light; and a glass wedge that receives the beam of light from the analyzer, wherein the glass wedge has a front facet that is tilted from perpendicular with respect to the optical path of the beam of light and a back facet that is perpendicular to the optical path of the beam of light. Each of the polarizer, the Faraday rotator, the analyzer, and the glass wedge are configured substantially parallel with respect to the optical path of a beam of light such that the effective aperture of the optical isolator is maximized.

Yet another example embodiment of the invention is another optical isolator that is housed in a magnetic housing. This optical isolator includes: a polarizer having front and rear facets that are tilted from perpendicular with respect to the optical path of a beam of light; a magneto-optic crystal that receives the beam of light from the polarizer, wherein the Faraday rotator has front and rear facets that are tilted from perpendicular with respect to the optical path of the beam of light; an analyzer that receives the beam of light from the Faraday rotator, wherein the analyzer has a front facet that is tilted from perpendicular with respect to the optical path of the beam of light and a back facet that is perpendicular to the optical path of the beam of light; and a magnetic housing that houses the polarizer, magneto-optic crystal, and analyzer and provides a magnetic field. Each of the polarizer, the Faraday rotator, and the analyzer are configured substantially parallel with respect to the optical path of a beam of light such that the effective aperture of the optical isolator is maximized.

These and other features and advantages of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to an ultra compact optical isolator. The optical isolator generally includes a polarizer, a Faraday rotator, and an analyzer that are each arranged in series such that a beam of light passing through the optical isolator passes first through the polarizer, then through the Faraday rotator and, finally, through the analyzer. The outer edges of the polarizer, Faraday rotator, and analyzer, are preferably parallel to each other and to the travel path of the incoming laser beam (or other light source known in the art) so that the optical aperture through the optical isolator is maximized. Such a maximized aperture is herein referred to as a "clear aperture."

Figure 1:
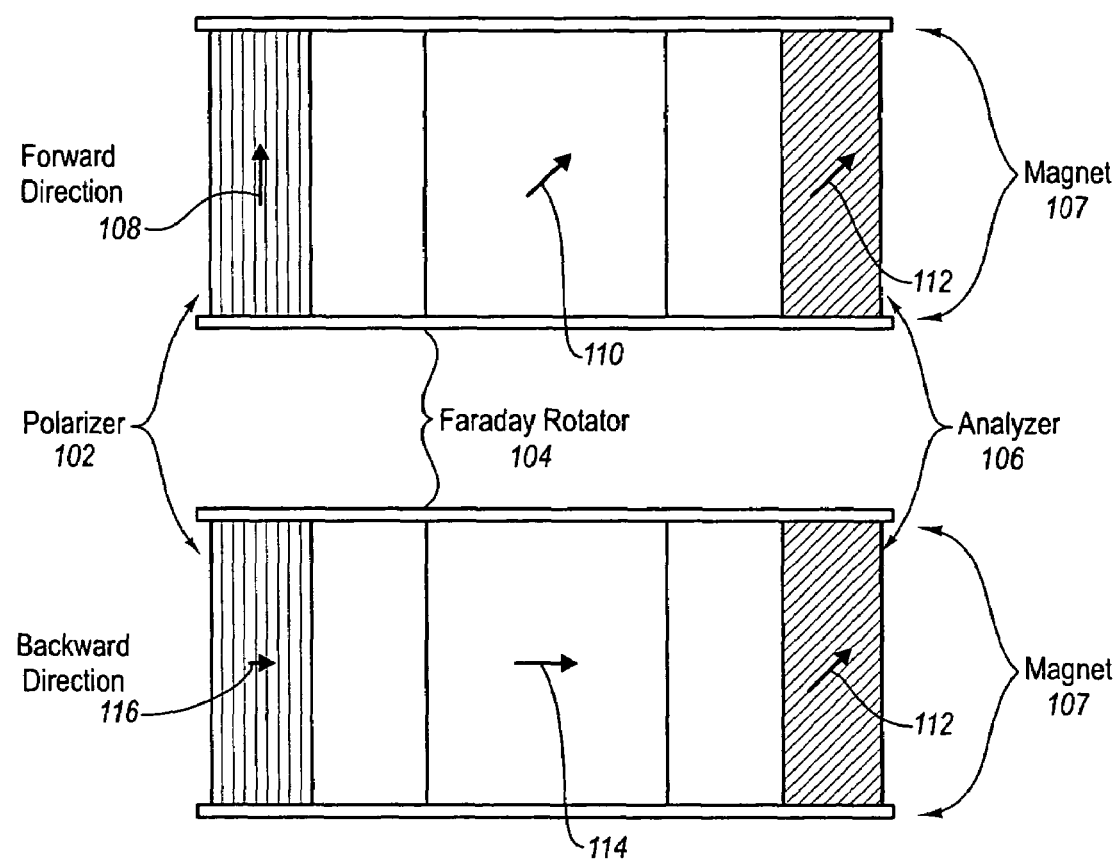
FIG. 1 illustrates the basic operation of a prior art optical isolator.
Figure 2:
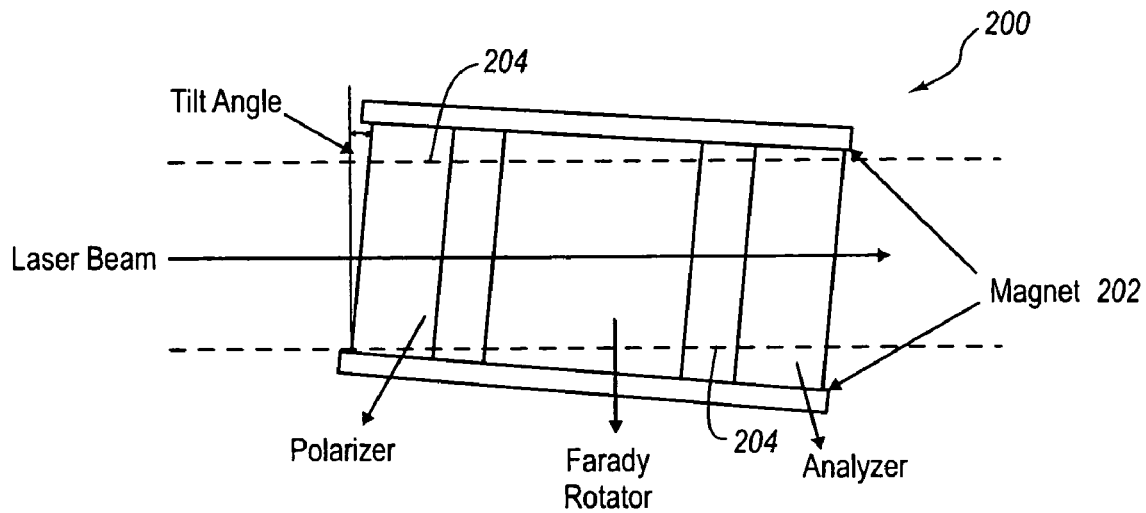
FIG. 2 illustrates an embodiment of a prior art optical isolator.
Figure 3:
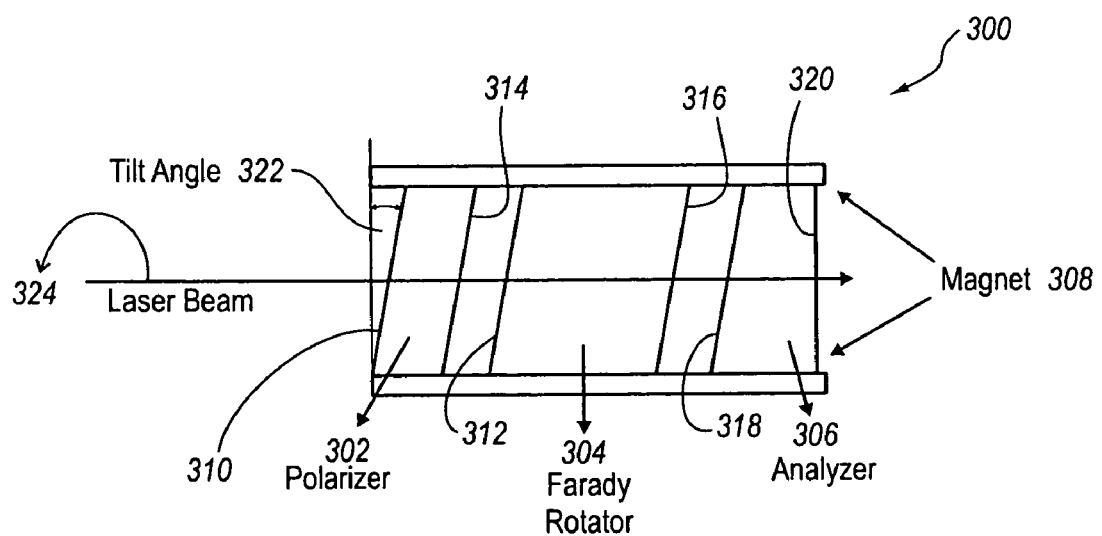
FIG. 3 is a schematic depiction of an optical isolator according to one embodiment of the invention.

In addition, each of the polarizer, the Faraday rotator, and the analyzer have at least one facet in the optical path of the light beam that is tilted from perpendicular with respect to the light beam such that reflections are avoided. In general, reflections from the end nearest the laser are most detrimental to transceiver performance and reflections from the far end face are inconsequential compared with reflections from fiber interfaces such as dematable connectors. Thus, as depicted in FIG. 3, each of the polarizer 302, Faraday rotator 304, and analyzer 306 may be implemented in various geometries including, but not limited to, parallelograms, trapezoids, wedges, or various other asymmetrical configurations.

More particularly, the analyzer preferably has a wedge shape such that one facet thereof is tilted to avoid reflections whereas the opposing facet has a surface perpendicular to the beam of light such that it can easily be attached to an LC connector via an optical epoxy.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of optical devices and systems have not been described in particular detail in order to avoid unnecessarily obscuring the present invention.

As generally depicted in FIG. 3, an optical isolator 300 according to the invention includes a polarizer 302, a Faraday rotator 304, and an analyzer 306. Preferably, each of the polarizer 302 and the analyzer 306 are connected to the Faraday rotator 304 via epoxy (with or without epoxy in the optical path) or held separately by specially designed holding fixtures. A magnetic housing 308 is also depicted and is used for the operation of the Faraday rotator 304. This is because Faraday rotators use a magneto-optic garnet for their operation and, with the exception of latching garnet, all garnets require a magnetic field, usually in a saturated condition, to function as Faraday rotators. As depicted, each of the polarizer 302 and the Faraday rotator 304 have a generally trapezoidal shape with top and bottom surfaces that are parallel to the top and bottom surface of the optical isolator as well as the direction of propagation of the beam of light. In addition, each of the polarizer 302 and the Faraday rotator 304 have front facets 310, 312 and rear facets 314, 316 that have a tilt angle 322 with respect to perpendicular from the laser beam 324 such that they do not reflect back in the direction of the incoming laser beam. Generally, the index match between the polarizer material and the epoxy is good enough that no AR coating is required on those surfaces. The MO crystal material, however, requires an AR coating for epoxy in the case of epoxied PGP stacks or air in the case of non-epoxied stacks.

The analyzer 306 has a generally wedge shape with top and bottom surfaces that are parallel to the top and bottom surfaces of the optical isolator as well as the polarizer and Faraday rotator. The front facet of the analyzer 318, as with the front and rear facets of the polarizer and Faraday rotator, is tilted with respect to perpendicular to the beam of light. The rear facet of the analyzer 320, however, is flat and perpendicular to the optical path of the beam of light.

The flat surface of the analyzer can be attached, such as by optical epoxy, directly to the LC connector, FC connector or other non-angled connectors. In this case, neither the surface of analyzer nor the surface of fiber attached to the LC connector would need an AR coating. The epoxy that bonds the surfaces together serves as an index matching fluid which eliminates the reflection from the fiber surface back to the fiber. Such a reflection would induce extra optical noise in the laser, called reflection induced relative intensity noise (RIN) which would cause receiver sensitivity penalty and is particularly problematic for 10G and higher speed optical transceivers.

The tilt angle corresponds to the tilting degree necessary for minimizing polarizer surface reflection of the isolator. Tilting the polarizer and the Faraday rotator (FR) chips relative to the isolator as a whole thus provides the tilt effect without turning the whole isolator. In this design, the laser light can pass through the entire chip areas without being clipped by the top and bottom surfaces of the optical isolator. This feature of the invention enables the manufacture of ultra-compact isolators. Because the polarizer and Faraday rotator chips are themselves tilted, however, polarizer and Faraday rotator material is not being saved by this method. What is saved is the need to make the assembly diameter larger for a given clear aperture, as is the case when the whole isolator assembly is tilted. Thus, a more compact isolator is achieved.

The wedge-shaped analyzers can be made by optical polishing by methods widely known in the art.

Figure 4:
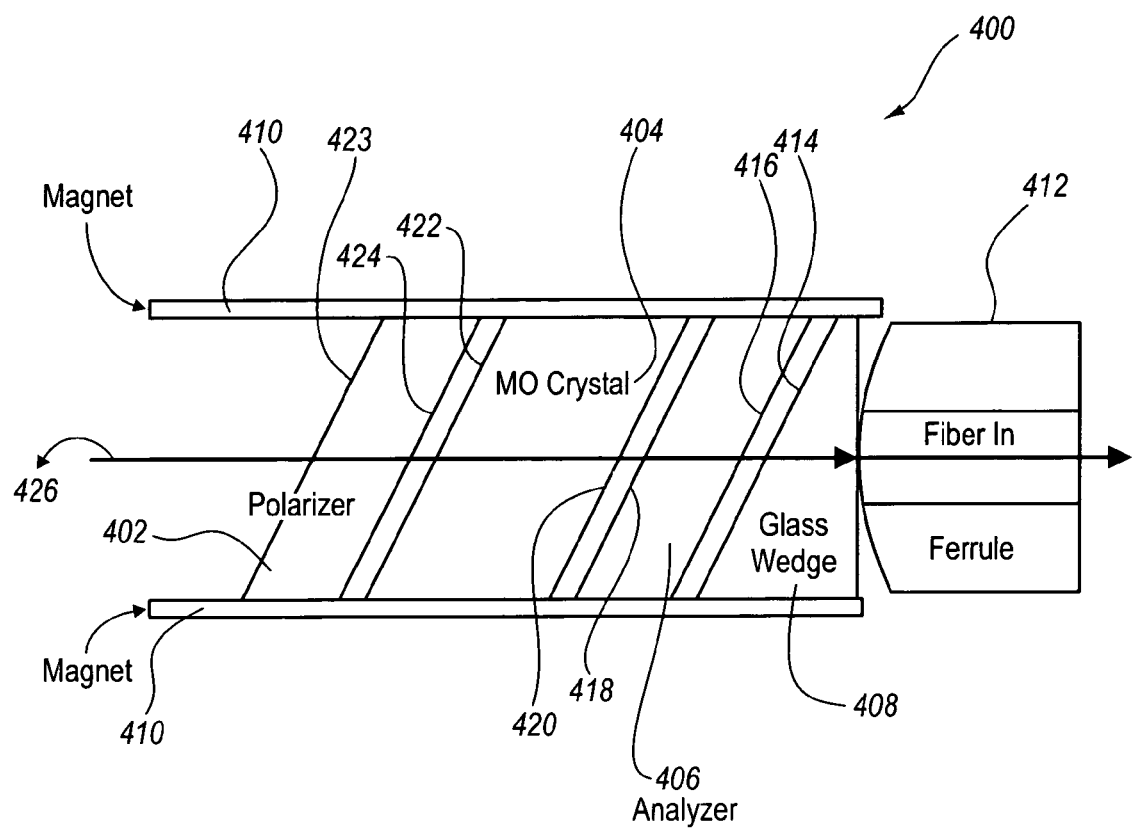
FIG. 4 is a schematic depiction of another optical isolator according to one embodiment of the invention.

As depicted in FIG. 4, the wedge-shaped analyzers can also be manufactured by using a wedge-shaped piece of glass 408 with similar physical structure to an analyzer. The wedge-shaped piece of glass is glued to the outside of the analyzer 406, which is preferably trapezoidal. The glass wedge 408 would be epoxied to the analyzer 406 on one side and to the fiber in fiber ferrule 412 on the other side. Similar to the embodiment of FIG. 3, the embodiment of FIG. 4 has a polarizer 402, MO crystal 404, analyzer 406, and glass wedge 408 with front surfaces 423, 422, 418, and 414 and back surfaces 424, 420, and 416 that are angled with respect to a beam of light 426.

By comparison to conventional devices, the present design enables more effective use of the isolator materials and consequently, reduces the overall cost of the isolator. The new isolator is particularly important for TOSAs with flat LC connectors because it can be attached directly to the connector. By doing so, the isolator not only fulfills the standards requirements, but also eliminates the reflection from the fiber end surface back to the fiber. Such noise would otherwise affect the quality of data transmission, which is particularly severe in 10G and faster optical transceivers.

Another problem with a conventional LC connector is that for 10G and faster optical transmission, the reflection from the fiber end surface can deteriorate the quality of the transmitted data. So far this problem has been addressed either by providing an antireflection coating on the fiber surface or by gluing a glass plate to the surface, both of which introduce additional cost. By attaching the new isolator directly to the LC connector surface, the surface reflection is eliminated much more effectively, without introducing extra cost.

In addition, those skilled in the art will recognize, in view of the disclosure herein, that it is not necessary for the isolators disclosed herein to be one piece. Rather, so long as the components are positioned in the order required for proper function, the pieces may be separated. For example, part of an isolator can reside with a transmitter optical subassembly and part can reside outside the transmitter optical subassembly with the fiber ferrule. One caveat is that whichever side a magneto-optic Faraday rotator is on must also have the magnet since the garnet of which the Faraday rotator is formed requires immersion in a magnetic field to function properly.

Finally, by making the device asymmetrical, meaning light passing through the device passes through angles surfaces on each component, the entire area of the isolator chip functions as part of the optical path, in contrast with the tilted conventional assembly. This enables the use of smaller magnets which in turn enables the entire optical isolator to be smaller and less expensive. In an ultracompact design the magnet and housing can be one and the same.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical isolator, comprising:
   a polarizer having front and rear facets that are tilted from perpendicular with respect to the optical path of a beam of light;
   a Faraday rotator that receives the beam of light from the polarizer, wherein the polarizer is placed in the optical path before the Faraday rotator and wherein the optical path of the beam of light is through the front and rear facets of the polarizer that are tilted from perpendicular with respect to the optical path such that the beam of light passes through the front and rear facets of the polarizer that are tilted from perpendicular before reaching the Faraday rotator and wherein the Faraday rotator has front and rear facets that are tilted from perpendicular with respect to the optical path of the beam of light wherein the optical path of the beam of light is through the front and rear facets of the Faraday rotator that are tilted from perpendicular with respect to the optical path; and
   an analyzer that receives the beam of light from the Faraday rotator, wherein the analyzer is placed in the optical path after the Faraday rotator and wherein the analyzer has a front facet that is tilted from perpendicular with respect to the optical path of the beam of light and a back facet that is perpendicular to the optical path of the beam of light, wherein the optical path of the beam of light is through the front facet of the analyzer that is tilted from perpendicular with respect to the optical path, and the back facet of the analyzer that is perpendicular to the optical path such that the beam of light passes through the front facet of the analyzer before reaching the back facet of the analyzer, and wherein the back facet of the analyzer is configured such to be attachable to a connector or a fiber ferrule;
   wherein each of the polarizer, the Faraday rotator, and the analyzer are configured substantially parallel with respect to the optical path of a beam of light such that the effective aperture of the optical isolator is maximized.

2. An optical isolator as defined in claim 1, wherein each of the front and rear facets of the polarizer, the front and rear facets of the Faraday rotator, and the front facet of the analyzer have a tilt angle of from about 0° to about 8° from perpendicular to the optical path of the beam of light.

3. An optical isolator as defined in claim 1, wherein each of the front and rear facets of the polarizer, the front and rear facets of the Faraday rotator, and the front facet of the analyzer have a tilt angle of from about 2° to about 6° from perpendicular to the optical path of the beam of light.

4. An optical isolator as defined in claim 1, wherein the Faraday Rotator comprises a magneto-optic crystal.

5. An optical isolator as defined in claim 1, wherein the beam of light is generated by a laser diode.

6. An optical sub-assembly comprising:
   an LC connector having a flat surface; and
   an optical isolator as defined in claim 1, wherein the back facet of the analyzer is mounted to the flat surface of the LC connector.

7. An optical sub-assembly as defined in claim 6, wherein the LC connector is in communication with an optical fiber and the back surface of the analyzer is mounted to the flat surface of the LC connector by an optical epoxy, wherein the optical epoxy is an index matching fluid that reduces reflection from a fiber surface back to the optical fiber.

8. An optical isolator as defined in claim 1, further comprising a magnetic housing that houses the polarizer, Faraday rotator, and analyzer and provides a magnetic field to operate the Faraday rotator.

9. An optical isolator as defined in claim 1, wherein at least one component among the polarizer, the Faraday rotator, and the analyzer is not permanently assembled with the other components.

10. An optical isolator, comprising:
    a polarizer having front and rear facets that are tilted from perpendicular with respect to the optical path of a beam of light;
    a magneto-optic crystal forming a Faraday rotator that receives the beam of light from the polarizer, wherein the polarizer is placed in the optical path before the Faraday rotator and wherein the optical path of the beam of light is through the front and rear facets of the polarizer that are tilted from perpendicular with respect to the optical path such that the beam of light passes through the front and rear facets of the polarizer that are tilted from perpendicular before reaching the Faraday rotator and wherein the Faraday rotator has front and rear facets that are tilted from perpendicular with respect to the optical path of the beam of light, wherein the optical path of the beam of light is through the front and rear facets of the Faraday rotator that are tilted from perpendicular with respect to the optical path;
    an analyzer that receives the beam of light from the Faraday rotator, wherein the analyzer is placed in the optical path after the Faraday rotator and wherein the analyzer has a front facet that is tilted from perpendicular with respect to the optical path of the beam of light and a back facet that is perpendicular to the optical path of the beam of light such that the back facet of the analyzer is configured to be attached to a connector or a fiber ferrule, wherein the optical path of the beam of light is through the front facet of the analyzer that is tilted from perpendicular with respect to the optical path, and the back facet of the analyzer that is perpendicular to the optical path such that the beam of light passes through the front facet of the analyzer before reaching the back facet of the analyzer, and wherein the back facet of the analyzer is configured such to be attachable to a connector or a fiber ferrule; and a magnetic housing that houses the polarizer, magneto-optic crystal, and analyzer and provides a magnetic field;

wherein each of the polarizer, the Faraday rotator, and the analyzer are configured substantially parallel with respect to the optical path of a beam of light such that the effective aperture of the optical isolator is maximized.

11. An optical isolator as defined in claim 10, wherein each of the front and rear facets of the polarizer, the front and rear facets of the Faraday rotator, and the front facet of the analyzer have a tilt angle of from about 0° to about 8° from perpendicular to the optical path of the beam of light.

12. An optical isolator as defined in claim 10, wherein each of the front and rear facets of the polarizer, the front and rear facets of the Faraday rotator, and the front facet of the analyzer have a tilt angle of from about 2 to about 6° from perpendicular to the optical path of the beam of light.

13. An optical isolator as defined in claim 10, wherein the Faraday Rotator comprises a magneto-optic crystal.

14. An optical sub-assembly comprising:

an LC connector having a flat surface; and an optical isolator as defined in claim 10, wherein the back facet of the analyzer is mounted to the flat surface of the LC connector.

15. An optical sub-assembly as defined in claim 14, wherein the LC connector is in communication with an optical fiber and the back surface of the analyzer is mounted to the flat surface of the LC connector by an optical epoxy, wherein the optical epoxy is an index matching fluid that reduces reflection from a fiber surface back to the optical fiber.

* * * * *

UNITED STATES PATENT AND TRADEMARK OFFICE
CERTIFICATE OF CORRECTION

PATENT NO. : 7,474,813 B2  Page 1 of 1
APPLICATION NO. : 10/836711
DATED : January 6, 2009
INVENTOR(S) : Shi et al.

It is certified that error appears in the above-identified patent and that said Letters Patent is hereby corrected as shown below:

Column 2
Line 3, change "makes" to --makes it--

Column 6
Line 58, change "standards" to --standard--

Column 7
Line 17, change "angles" to --angled--

Signed and Sealed this

Ninth Day of March, 2010

David J. Kappos
*Director of the United States Patent and Trademark Office*